UNITED STATES PATENT OFFICE.

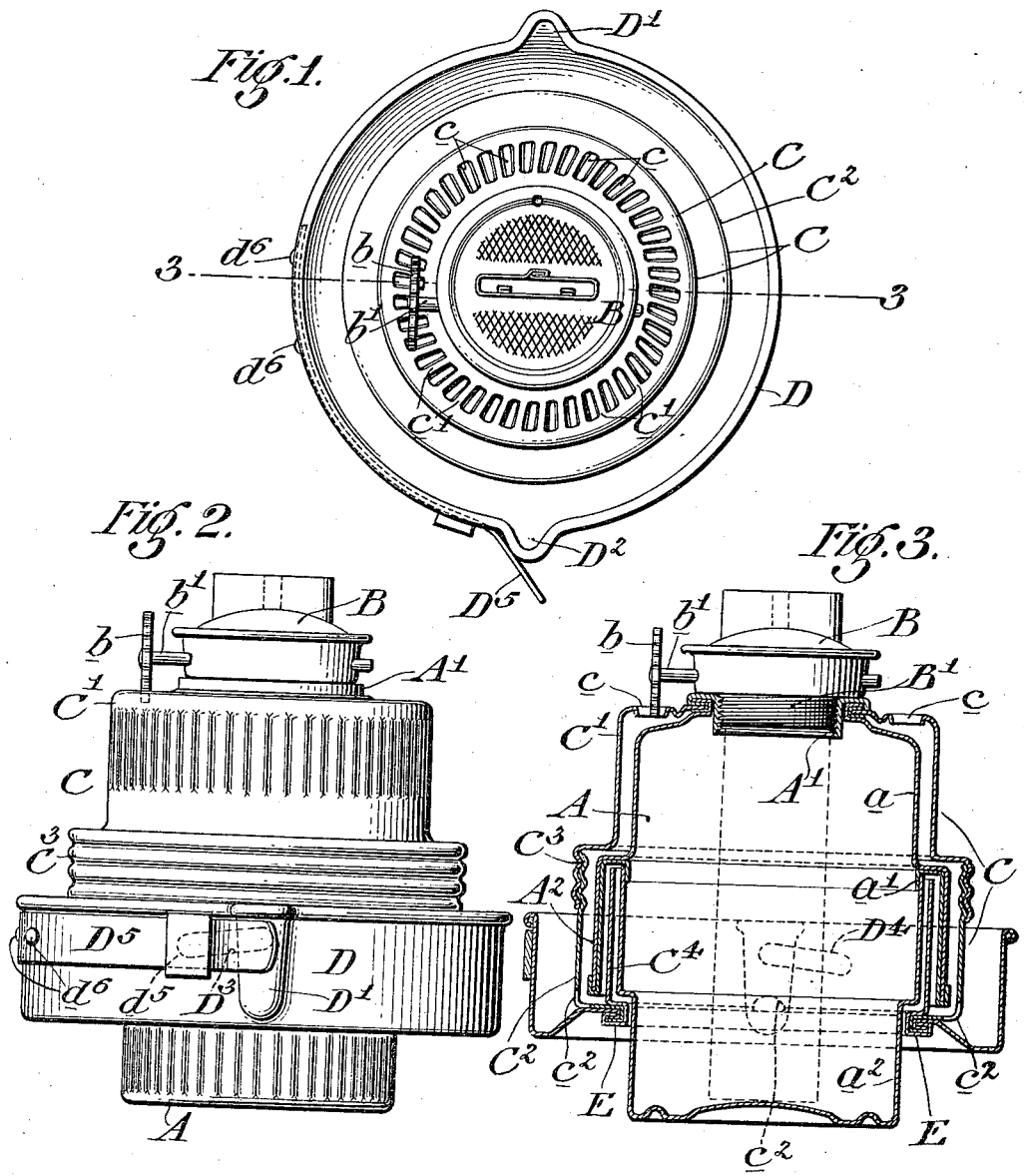

JOHN T. CASEY, OF PHILADELPHIA, PENNSYLVANIA, ASSIGNOR TO KEYSTONE LANTERN COMPANY, A CORPORATION OF NEW JERSEY.

LAMP OR LANTERN.

1,013,275.　　Specification of Letters Patent.　　Patented Jan. 2, 1912.

Application filed January 7, 1911. Serial No. 601,488.

*To all whom it may concern:*

Be it known that I, JOHN T. CASEY, a citizen of the United States, residing at the city of Philadelphia, in the county of Philadelphia and State of Pennsylvania, have invented certain new and useful Improvements in Lamps or Lanterns, of which the following is a specification.

My invention relates to oil pots for lamps and lanterns embodying a type in which the oil pot may be detachably united to the body of the lamp or lantern from below and in which the wick may be raised or lowered without opening portions of the frame work of the lamp or lantern thus exposing the flame to drafts of air, and to this end embodies improvements in lanterns in addition to those described and claimed in Letters Patent granted to me December 30th, 1902, No. 717,346.

The object of the present invention is to simplify and improve the construction of the oil pots of this type, make them better able to withstand the conditions of use to which they may be subjected and provide means whereby oil, whether that overspreading the burner head in the act of filling the oil pot, or drawn upward by capillary attraction and in turn overspreading the top of the oil pot will be guided and directed to a point where it will be trapped and held and effectually prevented from reaching that part of the structure to which the hand of the user of the lantern is applied in the act of raising and lowering the wick as occasion requires. And this object is accomplished, chiefly, by inclosing the oil pot proper within a casing of peculiar construction, to be hereinafter described.

The various features of novelty which characterize my invention are pointed out with particularity in the claims annexed to and forming a part of this specification.

For a better understanding of the invention, however, and the advantages possessed by it, reference may be had to the accompanying drawings and descriptive matter in which I have illustrated and described one of the forms in which my invention may be embodied.

The drawings accompanying the specification, briefly stated, but hereinafter described in detail, in Figures 1, 2 and 3, respectively, illustrate in plan, elevation and sectional elevation, the oil pot of a lantern with burner attachment, a casing surrounding the oil pot and provided with means for directing the oil leakage and trapping same in accordance with my invention.

Referring now to the several figures of the drawings:—A, represents the oil receptacle or oil reservoir proper of the oil pot, which is preferably formed of several pieces of metal as shown in Fig. 3. The oil reservoir is provided at its uppermost portion with a threaded collar A', to receive a correspondingly threaded portion B' of a burner B. Approximately midway between the top and bottom of the oil reservoir is a flange $A^2$ which may if desired be soldered or otherwise directly fastened to the wall of the oil reservoir, or as preferred may be fashioned in the following manner. Referring again to Fig. 3 of the drawings it will be noted that the oil reservoir and its flange embodies three members, an upper shell $a$, a centrally disposed shell $a'$, forming a portion of the flange and a lower shell $a^2$. The shell $a$, passes downward and outward over the shell $a'$ while the shell $a'$ passes upward, outward, downward and around the lower margins of the shell $a$, the lower extremities of these two shells forming the flange $A^2$. The shell $a^2$, has its upper half of greater diameter than its lower half and fits snugly around the upper flanged portion of the shell $a'$. This method of assembling the several members of the oil reservoir not only serves to guard against leakage but also as a means of reinforcing the central portion of the oil reservoir which is desirable in a construction of this general type.

Inclosing the oil reservoir is a casing C, embracing two members, an upper member C' forming at its uppermost position a journal for the neck of the oil reservoir A, and a lower member $C^2$, the two being connected to and in a manner forming a part of a supporting ring or band D. The members C' and $C^2$ being threaded and detachably secured together as shown at $C^3$. The member C' of the casing C, is provided with a circular series of openings $c$, fashioned in such a manner as to form a circular series of teeth $c'$, Fig. 1, to engage with a pinion $b$, mounted on the conventional wick raising stem $b'$ $b'$ of the burner B. The openings $c$, also serve as a means to permit the oil carried up over the burner head by the capillary action of the wick and other like means to enter the space between the casing and the oil reservoir and to pass downward into the bottom of the ring or band D, where it is trapped and held. The member $C^2$ of the casing C, is provided with a flange $C^4$ which is located between the oil reservoir A, and its flange $A^2$, so that together with the said flange $A^2$, the flange $C^4$ serves as a trap to prevent oil entering the annular space between the casing and the oil reservoir from flowing over the lower end of the oil reservoir and in so doing cause difficulty by its lubricating properties in the operation of the wick. The member $C^2$ of the casing C, is provided with openings $c^2$ $c^2$ &c. to permit the escape of oil into the lowermost portion of the supporting ring D. The lower margins of the member $C^2$, the flange $C^4$ and supporting ring D are united together by a lap fold as shown at E, in Fig. 3. The supporting ring D, is recessed at points D' and $D^2$ to receive the conventional pins of the lantern frame which when the oil pot is in place rest in inclined slots $D^3$ and $D^4$, one of the pins of the lantern frame being engaged by an opening $d^5$ of a spring $D^5$, which spring is secured by rivets $d^6$ $d^6$ shown in Figs. 1 and 2.

While I have shown and described what I consider to be the preferred embodiment of my invention, it will be understood that I do not limit myself in any way to specific details of construction except where such are pointed out in the claims as details, others than those herein shown and described may be made without departing from the spirit of my invention.

Having now described my invention what I claim as new and desire to secure by Letters Patent is:—

1. An oil receptacle adapted to receive a burner, in combination with a casing of larger diameter inclosing the oil receptacle, leaving an intervening channel or passageway for the draining of oil, said casing being provided with openings on its top surface for the admission of oil and at its lower end with an opening for its escape and a receptacle for trapping and retaining the oil which passes downward through the channel or passageway.

2. An oil pot, comprising an oil reservoir provided with a threaded opening to receive a burner, together with a downwardly projecting flange, a casing surrounding the oil reservoir and furnishing a support therefor, the casing being provided on its uppermost surface with a circular series of openings for the admission of oil and at its lowermost portion with an opening for its escape, a flange projecting upwardly from the casing and combining with the downwardly projecting flange of the oil receptacle to form a trap, and an outer receptacle for retaining oil which passes between the casing and the oil reservoir.

3. An oil pot, comprising an oil reservoir provided with a burner together with a downwardly projecting flange, a casing surrounding the oil receptacle and inclosing its neck thereby forming a journal in which the oil receptacle may be rotated, the casing being provided with a circular series of openings for the admission of oil, as also to receive the teeth of a pinion mounted upon the stem of the burner, the lowermost portion of the casing being provided with an annular receptacle for retaining oil which passes between the casing and the oil reservoir and thence through an opening in the lower extremity of the casing, and a flange extending upwardly from the casing between the oil reservoir and its flange to trap the oil and turn it away from the oil reservoir.

4. An oil pot, comprising an oil reservoir provided with a burner together with a downwardly projecting flange, a casing composed of upper and lower members threaded together, and thereby inclosing the oil reservoir above and below, but leaving an intervening space for the draining of oil, the upper member of the casing being provided on its uppermost surface with openings for the admission of oil and the lower member being provided with an opening for its escape, a flange projecting upwardly from the lower member of the casing between the oil reservoir and its flange to turn the oil away from the surface of the oil reservoir, and an outer receptacle for retaining oil which passes between the casing and the oil reservoir.

5. An oil pot comprising a rotatable oil reservoir provided with a burner together with a downwardly extending flange, a casing forming a support for the oil reservoir and provided with a circular series of teeth to engage the teeth of a pinion on a wick raising device of the burner, a flange secured to the casing and arranged between the oil reservoir and its flange and a support connected to the casing and arranged to form a receptacle to contain oil which may pass downward between the oil reservoir and its casing.

6. An oil pot comprising a rotatable oil reservoir having a burner and a centrally disposed flange which acting together with an adjacent flange is adapted to form an oil trap, an upper casing having its uppermost portion connected to the neck of the oil reservoir at which point the casing is provided with a circular series of openings to be engaged by the pinion of a wick raising stem, a lower casing threaded to the upper casing and having a flange intersecting that of the oil reservoir and a supporting ring connected to the lower casing for the purpose specified.

In testimony whereof I have hereto affixed my signature in presence of two witnesses.

JOHN T. CASEY.

Witnesses:
 JAY R. GRIER,
 CHAS. C. COLLIER.